US012709109B2

(12) United States Patent
Suzuki et al.

(10) Patent No.: US 12,709,109 B2
(45) Date of Patent: Aug. 18, 2026

(54) PRINTING DEVICE

(71) Applicant: SEIKO EPSON CORPORATION, Tokyo (JP)

(72) Inventors: Hidenao Suzuki, Shiojiri (JP); Tomohisa Kano, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 259 days.

(21) Appl. No.: 18/764,502

(22) Filed: Jul. 5, 2024

(65) Prior Publication Data

US 2025/0010644 A1 Jan. 9, 2025

(30) Foreign Application Priority Data

Jul. 6, 2023 (JP) ................................ 2023-111248

(51) Int. Cl.
*B41J 29/13* (2006.01)
*B41J 15/04* (2006.01)

(52) U.S. Cl.
CPC ............. *B41J 29/13* (2013.01); *B41J 15/046* (2013.01)

(58) Field of Classification Search
CPC . B41J 29/13; B41J 15/046; B41J 3/543; B41J 2/21; B41J 3/407; B41J 3/4075; B41J 3/445; B41J 15/18
See application file for complete search history.

(56) References Cited

U.S. PATENT DOCUMENTS

2021/0060989 A1* 3/2021 Hagstrom .............. A23P 20/20

FOREIGN PATENT DOCUMENTS

JP 2016-060555 A 4/2016

* cited by examiner

*Primary Examiner* — Bradley W Thies
(74) *Attorney, Agent, or Firm* — Dority & Manning, P.A

(57) ABSTRACT

The printing device includes a housing, wherein the housing includes a first surface, a second surface, and an opening and closing section, the opening and closing section is opened and closed by pivoting around a top surface pivoting shaft, which is along a top surface of the housing, forms at least a portion of the first surface and at least a portion of the top surface of the housing, and includes an upper section, the upper section cover is arranged at a position where it faces a bottom surface of the housing when the opening and closing section is at its most opened state within its pivotable range, and at a position where, in a plan view, the upper section cover does not protrude outward from the second surface when the opening and closing section is at its most opened state within its pivotable range.

11 Claims, 12 Drawing Sheets

PRINTING DEVICE

The present application is based on, and claims priority from JP Application Serial Number 2023-111248, filed Jul. 6, 2023, the disclosure of which is hereby incorporated by reference herein in its entirety.

BACKGROUND

1. Technical Field

The present disclosure relates to a printing device.

2. Related Art

In the related art, a printing device having a housing, a medium accommodation section for storing a print medium, and an opening and closing section for openably and closably covering the medium accommodation section is known. For example, JP-A-2016-60555 discloses a printing device having two opening and closing sections that open and close in different directions. It is also known, for example, a printing device that has an opening and closing section that has two flat surface sections that form two flat surfaces facing different directions, and the flat surface sections move integrally when the opening and closing section is opened or closed.

However, in the printing device of the related art, when the opening and closing section is opened, since the opening and closing section protrudes outside of the housing, which is provided in the printing device, in a plan view, there is a concern that the foot print of the printing device increases.

SUMMARY

An aspect for solving the above problem is a printing device including a medium accommodation section in which a print medium is stored; a print section that has an image forming section that forms an image on the print medium; a medium transport section that transports the print medium stored in the medium accommodation section toward the image forming section; and a housing that accommodates the medium accommodation section, the print section, and the medium transport section, wherein the housing has a first surface that is one side surface of the housing, a second surface that faces the first surface, and an opening and closing section that is opened and closed when the print medium is stored in the medium accommodation section, the opening and closing section is opened and closed by pivoting around a top surface pivoting shaft, which is along a top surface of the housing and has an upper section cover that forms at least a portion of the first surface and at least a portion of a top surface of the housing, and that moves above the housing when the opening and closing section is opened, and the upper section cover is arranged at a position where it faces a bottom surface of the housing when the opening and closing section is at its most opened state within its pivotable range, and at a position where, in a plan view, the upper section cover does not protrude outward from the second surface when the opening and closing section is at its most opened state within its pivotable range.

DESCRIPTION OF EMBODIMENTS

Hereinafter, embodiments in this disclosure will be described with reference to the drawings. In the description, the front-rear, left-right, and up-down directions are the same as the direction with respect to a printing device 1, unless otherwise noted. Reference symbol FR in each figure indicates a front direction of the printing device 1 with respect to the printing device 1 while installed where it is to be used, reference symbol UP indicates an upward direction of the printing device 1, and reference symbol LH indicates a left direction of the printing device 1.

Figure 1:
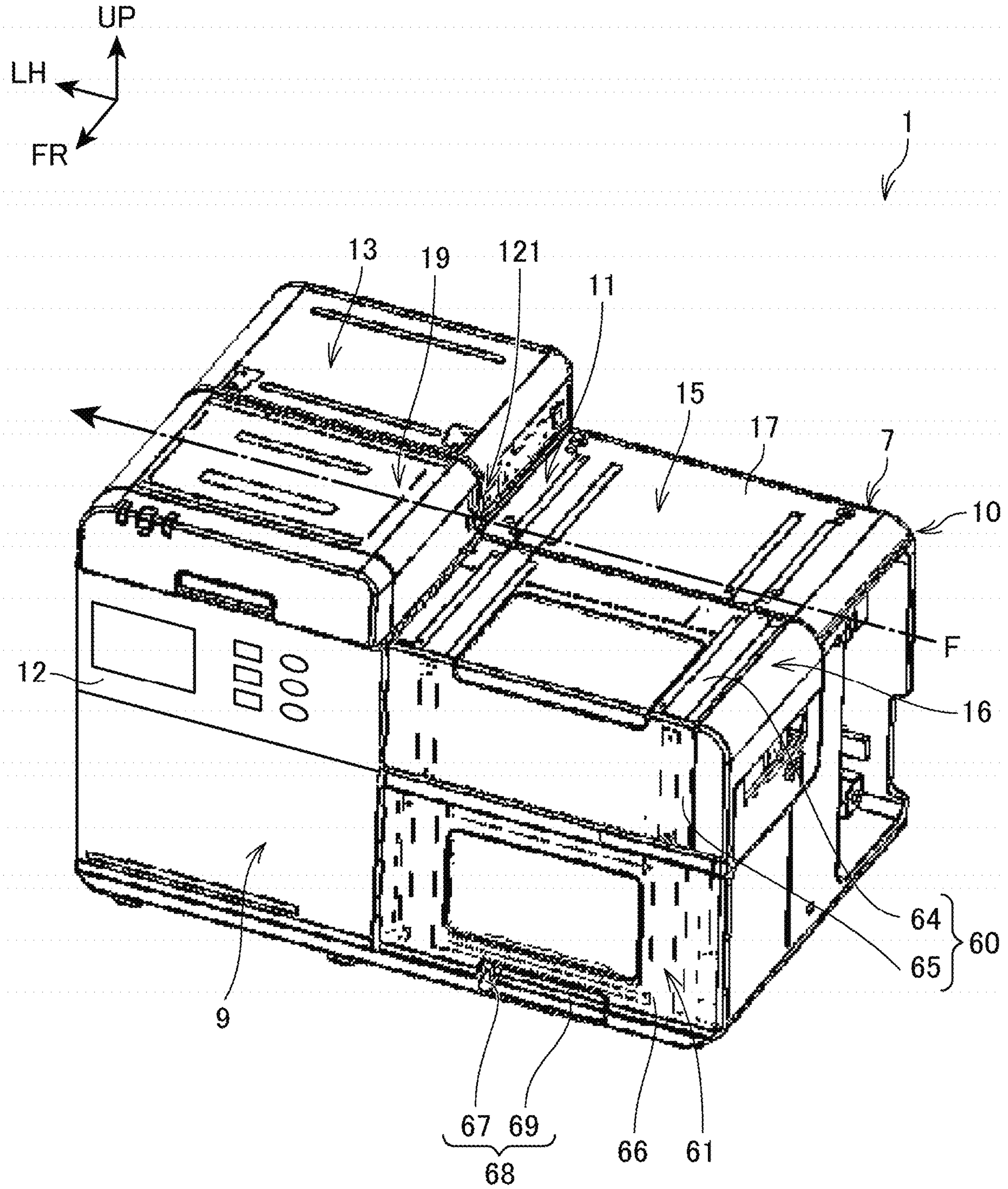
FIG. 1 is a perspective view of a printing device as viewed from the right direction.

FIG. 1 is a perspective view of a printing device 1 as viewed from the right direction. FIG. 1 shows a state in which the sheet cover 16 is closed. The printing device 1 is a so-called line type inkjet printer, which is equipped with a line-shaped inkjet head and prints characters and images on a print medium by ejecting ink from the inkjet head.

The print medium used for printing in the printing device 1 is a cut sheet that is cut into a predetermined size, or a continuous sheet. These sheets are formed of paper, synthetic resin, or the like. These sheets may be, for example, coated fine paper with a front surface finish that enhances ink absorbency and fixation, which is suitable for inkjet type printing.

The continuous sheet is, for example, a roll paper that is accommodated in the printing device 1 in a rolled state, or a fanfold paper that is supplied to the printing device 1 from outside the printing device 1 in a folded state. In addition to plain paper or fine paper rolled into a roll shape, label paper may be used as roll paper, in which standard size labels with adhesive on the reverse side are arranged on peel-away paper, which is the base paper, and rolled into a roll shape.

Figure 4:
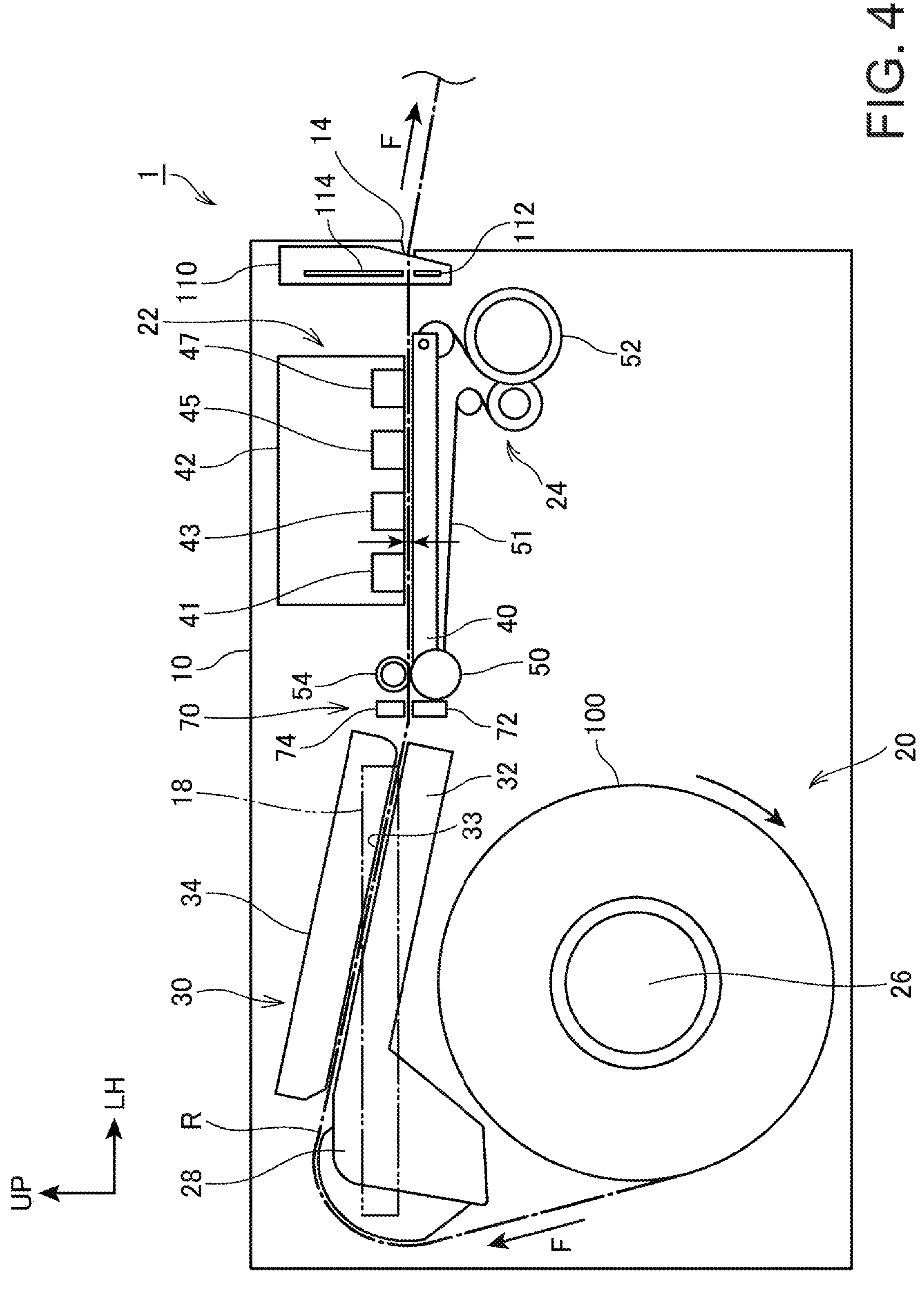
FIG. 4 is a rear view of main components of the printing device, showing various components relating to a transport path of the printing device.

In this embodiment, label paper 100 is used as the print medium. In the label paper 100, a label of a predetermined size with adhesive applied to the back surface thereof is arranged on a base paper on which a peel-away paper, which is peelable from the adhesive, is formed in an elongated shape, and the label paper 100 is wound in a roll shape. In the label paper 100, a plurality of labels are arranged at equal intervals in the longitudinal direction of the base paper. The printing device 1 transports the label paper 100 and prints characters and images on a print surface of each label on the label paper 100. That is, the printing device 1 is a label printer. In this case, the label paper 100 corresponds to a "print medium". The label paper 100 is shown in FIG. 4 (to be described later).

The printing device 1 has a device case 10, which is a substantially rectangular parallelepiped shape housing. The device case 10 is the outer section that forms the outer shell of the printing device 1 by combining panel-like members that form side surfaces, a front surface 9 and a rear surface 7, and like. A top surface 11 of the device case 10 is in a stepped shape. In the top surface 11 of the device case 10, a top surface section 13, which is located on the left side of the top surface 11, is positioned above a top surface section 15, which is located on the right side of the top surface 11. A front surface 9 corresponds to a "first surface." A rear surface 7 corresponds to a "second surface."

In the front surface 9 of the device case 10, a display/operation panel 12 is provided in a position in an upper half of the left side of the front surface 9. The display/operation panel 12 is provided with a display that functions as a display section for displaying predetermined information, and operation elements such as operation buttons. The display/operation panel 12 corresponds to an "operation section."

Figure 2:
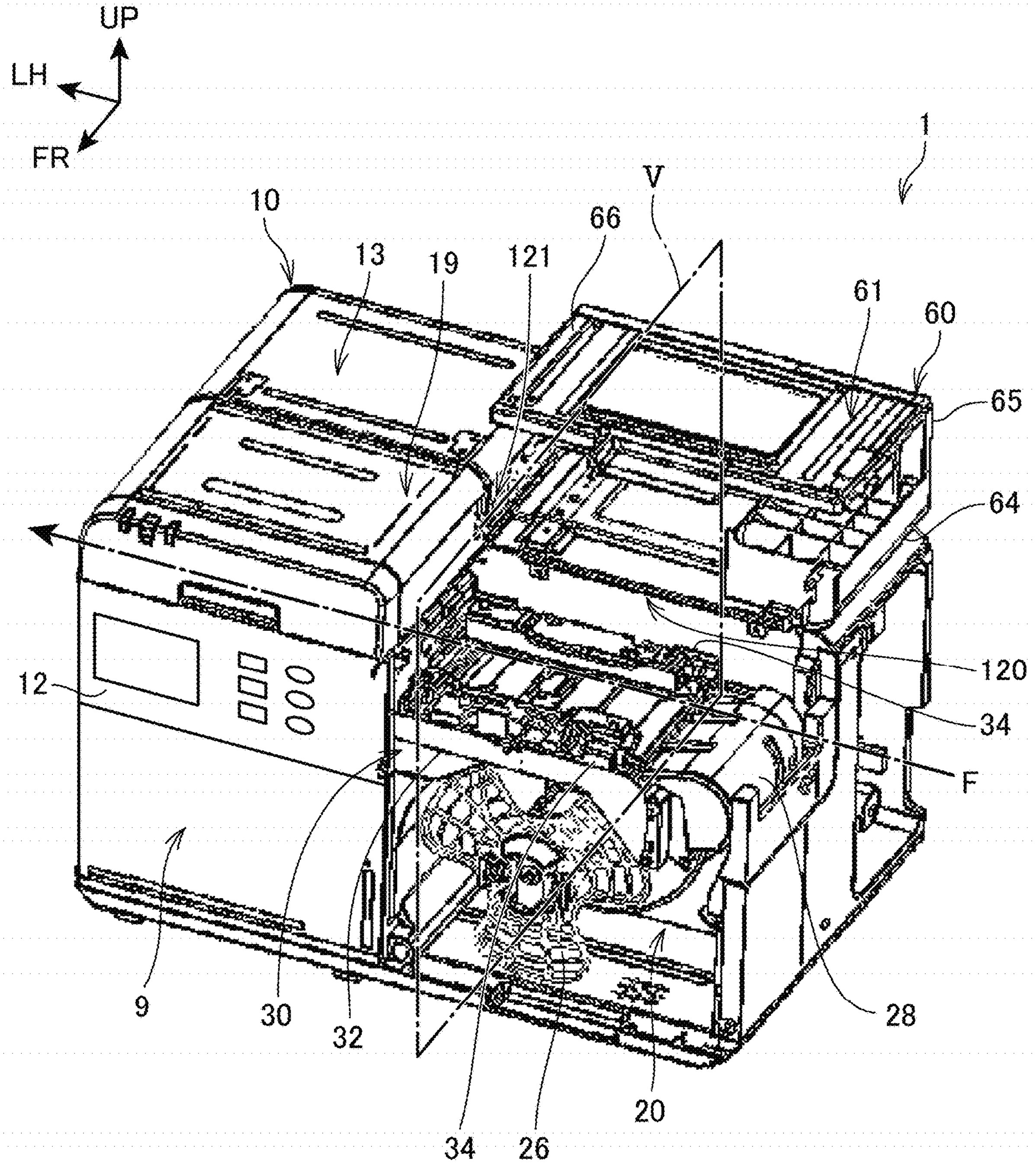
FIG. 2 is another perspective view of the printing device as viewed from the right direction.

FIG. 2 is another perspective view of the printing device 1 as viewed from the right direction. FIG. 2 shows a state in which a sheet cover 16 is open. The sheet cover 16 is provided on the device case 10 so that it can be opened and closed. The sheet cover 16 forms a part of the front surface 9 and a part of the top surface 11 of the printing device 1. The sheet cover 16 is formed extending from the right side of the front surface 9 of the device case 10 to the front side of the top surface 11 of the device case 10.

In this embodiment, the sheet cover 16 forms a part of the top surface of the printing device 1. As shown in FIG. 2, the sheet cover 16 is formed so as to be openable and closable by pivoting around a first coupling section 120, which is provided substantially at the center of the top surface of the device case 10. A top surface panel 17 is provided on the top surface section 15. The top surface panel 17 forms, in the top surface section 15, a flat surface, which is located further in the rear direction side than the sheet cover 16. The sheet cover 16 corresponds to an "opening and closing section."

To the inside of the sheet cover 16, an accommodation section 20 that stores label paper 100 is provided. By opening the sheet cover 16 of the printing device 1, the label paper 100 wound in a roll shape can be set into the accommodation section 20. In the printing device 1, it is possible to access the inside of the device case 10 from the outside by opening the sheet cover 16. This allows operations of the accommodation section 20 and of the various sections relating to the transport section.

In the device case 10, a print section cover 19 is provided on the left side of the sheet cover 16. The print section cover 19 forms a portion in a top surface section 13 that is close to the front surface 9 of the device case 10. The print section cover 19 is formed so as to be capable of opening and closing by pivoting around the central coupling section 121, which is provided substantially at the center of the top surface 11 of the device case 10. A print section 22 that prints on the label paper 100 is provided below the print section cover 19. In other words, the print section cover 19 covers the print section 22 from above.

Figure 3:
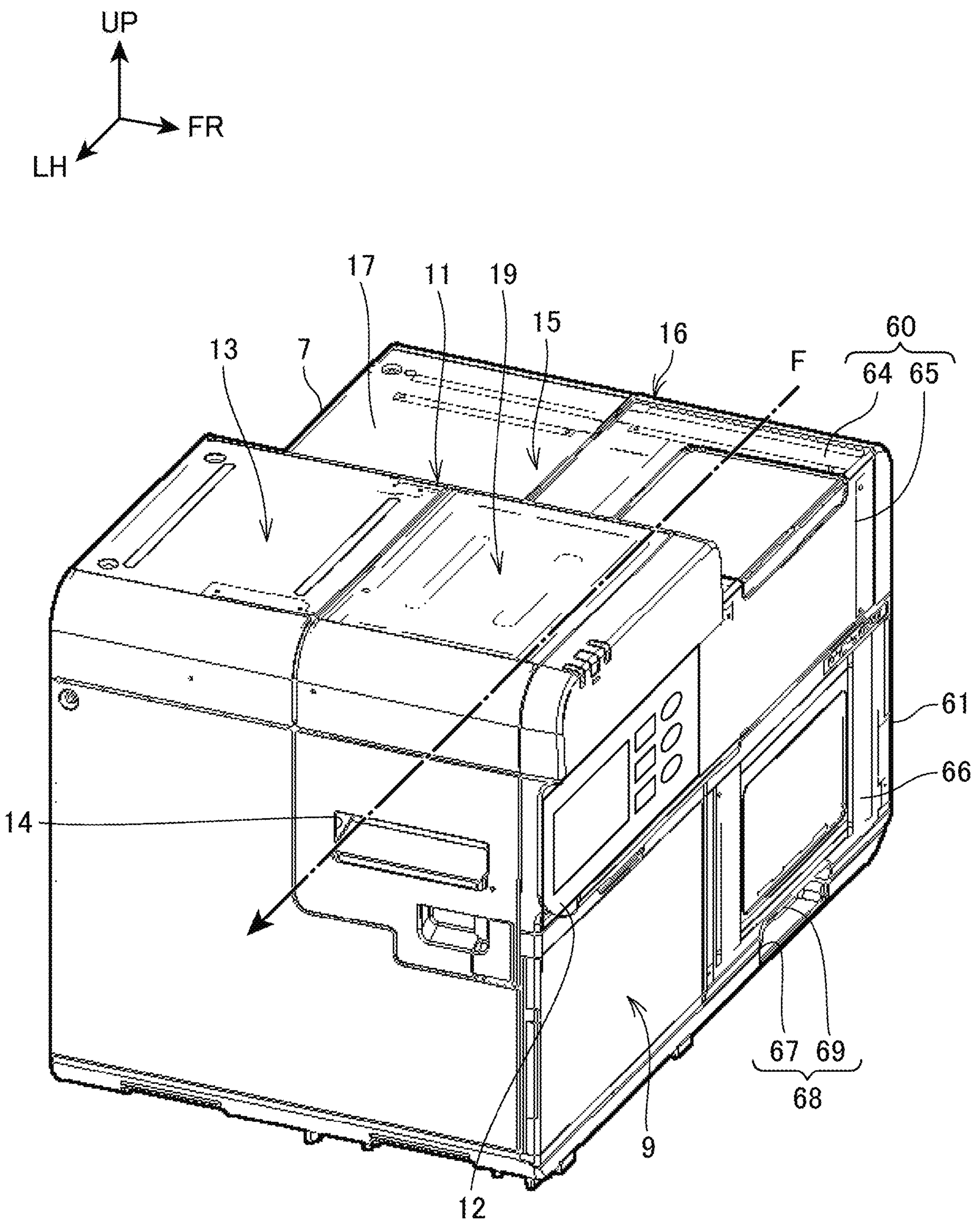
FIG. 3 is a perspective view of the printing device as viewed from the left direction.

FIG. 3 is a perspective view of the printing device 1 as viewed from the left direction. As shown in FIG. 3, a sheet discharge port 14 is formed on a left side surface, which is located on the left side of the device case 10. As viewed from the left direction, the sheet discharge port 14 has a slit-like shape extending in the front-rear directions at a center of a region of the front surface 9 side of the left side surface. In printing device 1, the label paper 100 that is printed on is discharged from the sheet discharge port 14. In this embodiment, the operation section, the display section, or the like are not provided on the side surface where the sheet discharge port 14 is formed.

FIG. 4 is a rear view of main components of the printing device 1, showing various components relating to a transport path R of the printing device. As shown in FIG. 4, the printing device 1 is equipped with the accommodation section 20 that stores the label paper 100, the print section 22 that performs printing on the label paper 100, and a transport section 24 that transports the label paper 100 from the accommodation section 20 to the print section 22. As shown in FIGS. 2 and 4, in the printing device 1, the accommodation section 20 is disposed on the right side inside the printing device 1, and the print section 22 is provided on the left side of the accommodation section 20. The transport section 24 is disposed below the print section 22.

The accommodation section 20 has a roll shaft 26 on which the label paper 100 is set. The roll shaft 26 is a rod-shaped member that is rotatable in the circumferential direction. The label paper 100 is stored in the accommodation section 20 by inserting the roll shaft 26 into the center of the roll of label paper 100. The roll shaft 26 may be connected to a drive section, for example, a motor, and may rotate with the operation of the drive section. In the printing device 1, the label paper 100 rotates by the rotation of the roll shaft 26.

The printing device 1 has a transport path R along which one end of the label paper 100 set to the roll shaft 26 is drawn out and transported to the sheet discharge port 14. In the transport path R, a tension lever 28 is disposed above the label paper 100 that is stored in the accommodation section 20. The tension lever 28 has a curved surface in the circumferential direction, and is formed in a columnar shape extending in the front-rear directions. The tension lever 28 applies tension to the label paper 100 to prevent slack. The label paper 100 is pulled upward at one end, contacts the tension lever 28, is bent by the tension lever 28, and then extends toward the left.

A paper guide unit 30 is disposed to the left side of the tension lever 28. The paper guide unit 30 guides the label paper 100 in the left direction, and suppresses skewing of the label paper 100 and deviation in transportation of the label paper 100. The paper guide unit 30 has a lower guide member 32 for supporting the label paper 100 from below, and a pair of paper pressing members 34 that are located on the upper surface side of the label paper 100.

The lower guide member 32 has a flat surface 33 extending in the left-right directions. The flat surface 33 has a width dimension along the front-rear directions of the device case 10 that is longer than the width dimension of the label paper 100. The label paper 100 is placed on and supported by the flat surface 33 of the lower guide member 32.

The paper pressing members 34 are located above the label paper 100 facing the lower guide member 32 and prevent the label paper 100 from lifting up. The paper pressing members 34 are located at the portions that are located at both ends of the lower guide member 32, along a direction that intersects the transport direction F. Each of the paper pressing members 34 is provided so as to be pivotable around a pivot shaft that is parallel to the transport direction F as a pivot center. The paper pressing members 34 are pivotable from a position where they face the flat surface 33 with a predetermined gap to a position where they are separated from the flat surface 33.

The label paper 100 is placed on the flat surface 33 in a state in which each of the paper pressing members 34 is located at a position separated from the flat surface 33. Then, the paper pressing member 34 is pivoted to the position that faces the flat surface 33 with the predetermined gap therebetween. As the result, the label paper 100 is sandwiched between the lower guide member 32 and the paper pressing members 34. The label paper 100 is transported in the paper guide unit 30 in a state of being sandwiched between the lower guide member 32 and the paper pressing members 34. The paper guide unit 30 functions as a guide section for the label paper 100.

To the left side of the paper guide unit 30, a print section 22, which prints on the label paper 100, is disposed. The print section 22 has a platen 40 and a print head 42. The print head 42 in this embodiment ejects inks of four colors of cyan (C), magenta (M), yellow (Y), and black (K) to form dots on the print surface of the label. The print head 42 has a nozzle section 41 that ejects K (black) ink, a nozzle section 43 that ejects C (cyan) ink, a nozzle section 45 that ejects M (magenta) ink, and a nozzle section 47 that ejects Y (yellow) ink. In the nozzle sections 41 to 47, a plurality of nozzles for ejecting ink are arranged in a row in the width direction of the label paper 100. The nozzles of the nozzle sections 41 to 47 are arranged along a direction intersecting the transport direction F. In this embodiment, the direction in which the nozzles are arranged is a direction that is orthogonal to the transport direction F. The direction in which the nozzles are arranged coincides with the width direction of the label paper 100. The print head 42 functions as an image forming section.

The print head 42 is a line inkjet head that can eject ink without scanning in the width direction of the label paper 100. Therefore, the nozzle arrays of the nozzle sections 41 to 47 are formed at least as wide as or wider than a printable area of the label paper 100. In this embodiment, the printable area corresponds to the print surface of the label. In this embodiment, an example configuration is described in which the nozzle sections are located along the transport direction F of the label paper 100 in the order of nozzle sections 41, 43, 45, and 47. However, the order in which the nozzle sections of each color are arranged in the transport direction F may be arbitrary.

The platen 40 has a flat surface located parallel to the transport direction F. This flat surface is located below the transport path R and faces the print head 42. The nozzle sections 41 to 47 and the platen 40 are located with a gap between them, which is a so-called platen gap. The platen 40 has a flat upper surface that supports the label paper 100 from below. The platen 40 is provided over at least the entire print area in the print section 22. The upper surface of the platen 40 is disposed substantially horizontal in the installation state and in the use state of the printing device 1.

The transport section 24 has a cylindrical-shaped transport roller 50. The transport roller 50 is disposed such that its longitudinal direction extends along a direction intersecting the transport direction F, and is provided pivotably in the circumferential direction. The transport roller 50 is disposed between the left end portion of the paper guide unit 30 and the right end portion of the platen 40 in the transport direction F.

As shown in FIG. 4, a driven wheel is provided at one end portion of the transport roller 50. A power transmitting belt 51 is wound around the driven wheel. The power transmitting belt 51 is wound around a drive shaft provided in a transport motor 52. By this, the transport roller 50 and the transport motor 52 are connected to each other via the power transmitting belt 51. The transport motor 52 is a drive section that rotates and drives the transport roller 50. The transport motor 52 and the power transmitting belt 51 are located below the platen 40.

The transport section 24 has a plurality of driven rollers 54. The driven rollers 54 are cylindrically shaped, and the periphery of the driven rollers 54 are formed of a flexible material such as rubber material. The plurality of driven rollers 54 are rotatably provided along the longitudinal direction of the transport roller 50. The driven rollers 54 are biased so that their circumferential surfaces are in contact with the circumferential surface of the transport roller 50. By this, the transport roller 50 and the driven roller 54 are arranged in contact with each other in a state where their circumferential surfaces are facing each other. The transport roller 50 is disposed on the lower guide member 32 side, and the driven rollers 54 are disposed on the paper pressing member 34 side.

Note that the transport roller 50 may be disposed on the lower guide member 32 side, in other words, on the platen 40 side. For example, the transport section 24 may have, instead of the transport roller 50, a transport belt that can move on the upper surface of the platen 40.

In the transport section 24, by driving the transport motor 52, the transport roller 50 is rotationally driven via the power transmitting belt 51, and the driven rollers 54 are rotationally driven by the transport roller 50. By this, the label paper 100 between the lower guide member 32 and the paper pressing member 34 is sandwiched between the transport roller 50 and the driven rollers 54 and is transported to the print section 22 by the rotational drive of the transport roller 50.

The label paper 100 that is placed on the flat surface 33 and that is fed out from the paper guide unit 30 is inserted and sandwiched between the transport roller 50 and the driven rollers 54. By rotating the transport roller 50 in this state, the label paper 100 is transported to the print section 22. In the printing device 1, a transport roller pair is formed by the transport roller 50 and the driven rollers 54.

The printing device 1 is provided with a label detecting device 70 in the transport path R. The label detecting device 70 detects a leading edge and a trailing edge of the label paper 100, and a leading edge and a trailing edge of the label. The label detecting device 70 of this embodiment is disposed on the downstream side of the paper guide unit 30 and on the upstream side of the transport roller 50. The label detecting device 70 is, for example, an optical transmission type sensor that has a light emitting section 72 on the lower surface side of the label paper 100 and a light receiving section 74 on the upper surface side of the label paper 100 with respect to the transport path R. The light emitting section 72 and the light receiving section 74 are located facing each other along the up-down directions, with a space between them to enable the label paper 100 to pass through therebetween. In other words, the light emitting section 72 and the light receiving section 74 are arranged to face each other along the thickness direction of the label paper 100. As a result, the light emitting section 72 and the light receiving section 74 are arranged at substantially the same position in the left-right directions.

The label detecting device 70 may be disposed on the downstream side of the transport roller 50 and on the upstream side of the print head 42. For example, the light emitting section 72 may be located on the lower guide member 32 side, and the light receiving section 74 may be located on the paper pressing member 34 side. In this case, the light emitting section 72 may be located on the platen 40 side, and the light receiving section 74 may be located on the print head 42 side.

In the label detecting device 70, the light emitting section 72 and the light receiving section 74 can be disposed so that the light receiving section 74 can receive light that is emitted from the light emitting section 72, at a predetermined signal intensity. In this case, the output value of the light receiving section 74, which indicates the amount of light received, differs depending on whether there is no label paper 100, there is a base paper, or there is a label directly under the light receiving section 74. In other words, the signal intensities of the light emitted from the light emitting section 72, the light transmitted through the base paper, and the light transmitted through the label are different from each other. Therefore, the label detecting device 70 can detect the leading edge and the trailing edge of the label paper 100 and the leading edge and the trailing edge of the label, based on the output value of the light receiving section 74, which indicates the amount of light received by the light receiving section 74.

A cutter unit 110 is disposed downstream of the print head 42 in the transport direction F, in other words, on the left side of the print head 42. The cutter unit 110 has a fixed blade 112 and a movable blade 114 which are located across the transport path R. The movable blade 114 is connected to a drive section such as a motor which drives the cutter via a gear or the like. In the cutter unit 110, when the motor is driven, the movable blade 114 moves toward the fixed blade 112 and cuts the label paper 100. The cutter unit 110 may cut the label paper 100 so as to leave a part of the label paper 100 uncut in the width direction, or may completely cut the label paper 100. The printing device 1 cuts the label paper 100 printed by the print head 42 to a predetermined length by the cutter unit 110 and discharges it from the sheet discharge port 14. Note that the cutter unit 110 is formed separately from the printing device 1, and may be detachably disposed, for example, on the left side surface of the printing device 1.

As shown in FIG. 4, the printing device 1 has a control substrate 18 that controls each section of the printing device 1. The control substrate 18 has a CPU, ROM, RAM, and the like, as the calculation execution section. In the ROM of the control substrate 18, firmware executable by the CPU, data related to the firmware, and the like are stored in a nonvolatile manner. The RAM temporarily stores data and the like related to the firmware executed by the CPU. The control substrate 18 may have other peripheral circuits and the like. The control substrate 18 may have a storage section capable of storing various programs and data, such as control programs and data related to the control programs, in a non-volatile manner.

The control substrate 18 is formed that it can detect operations executed with respect to the printing device 1, a transport amount of the label paper 100, and the like. The control substrate 18 is formed so as to be able to control the drive section provided in the printing device 1, such as the transport motor 52. In the print head 42, the control substrate 18 supplies voltage to a pump that supplies ink from the ink tank and to the piezoelectric elements that are provided in the nozzle sections 41 to 47 of the print head 42, to operate them. By this, the printing device 1 forms dots by ejecting ink droplets from each of the nozzles of nozzle sections 41 to 47.

The control substrate 18 is formed so as to operate the light emitting section 72 and light receiving section 74, and to acquire a detected value of the label detecting device 70. The label detecting device 70 functions as a detection means in conjunction with the control substrate 18.

Figure 5:
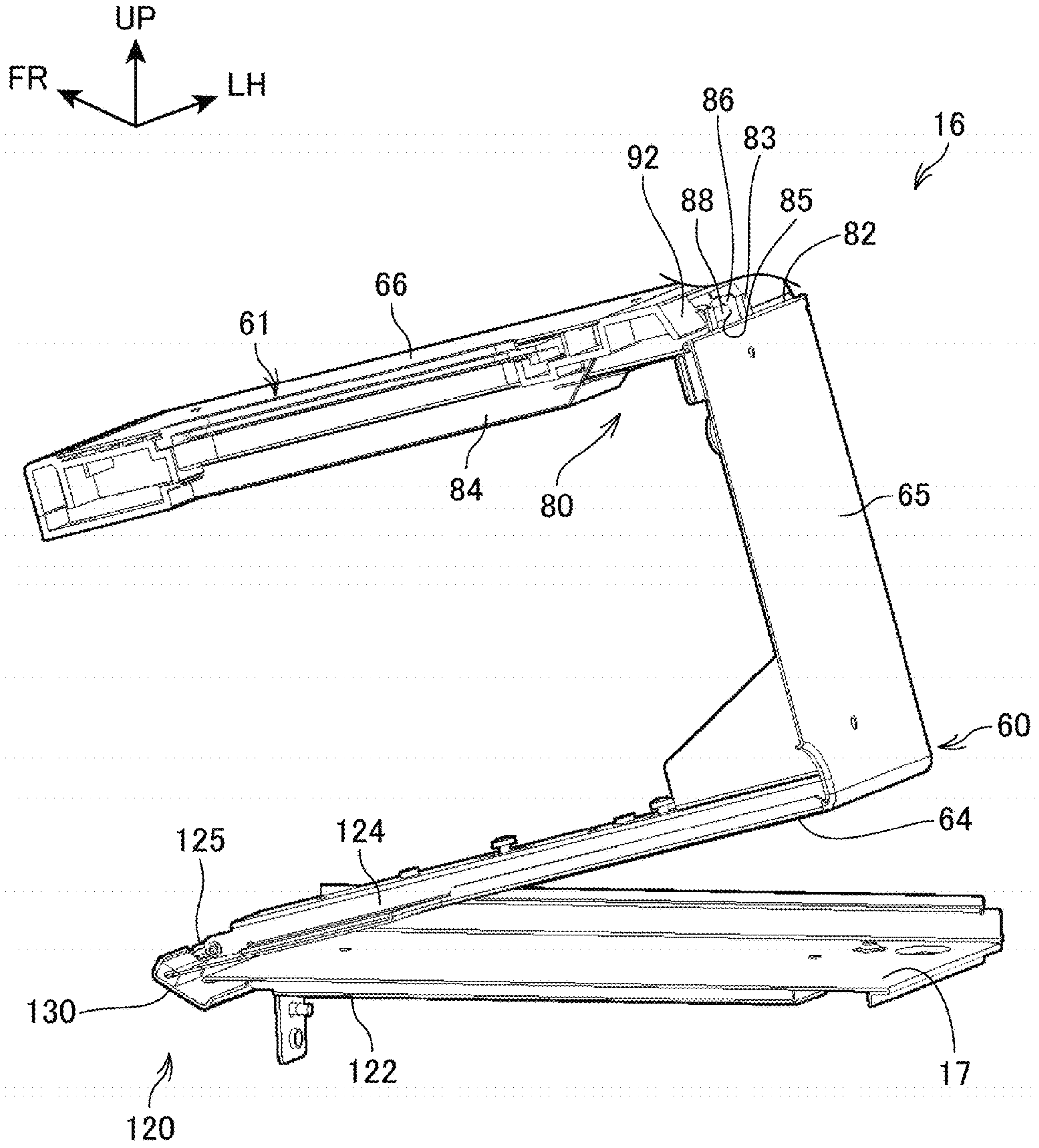
FIG. 5 is a perspective view of a sheet cover.

Next, the sheet cover 16 will be described. FIG. 5 is a perspective view of the sheet cover 16. FIG. 5 shows the sheet cover 16 that was cut in a virtual plane V of FIG. 2. As shown in FIGS. 1 and 2, the sheet cover 16 has an upper cover section 60 and a lower cover section 61. In the device case 10, the upper cover section 60 is integrally provided with a top surface panel section 64 that forms a flat surface located on the front surface 9 side of the top surface section 15 and a front surface panel section 65 that forms a flat surface located on the right side and upper side of the front surface 9. As shown in FIG. 5, the upper cover section 60 is formed in a substantially L-shape as viewed from the left-right directions.

Figure 6:
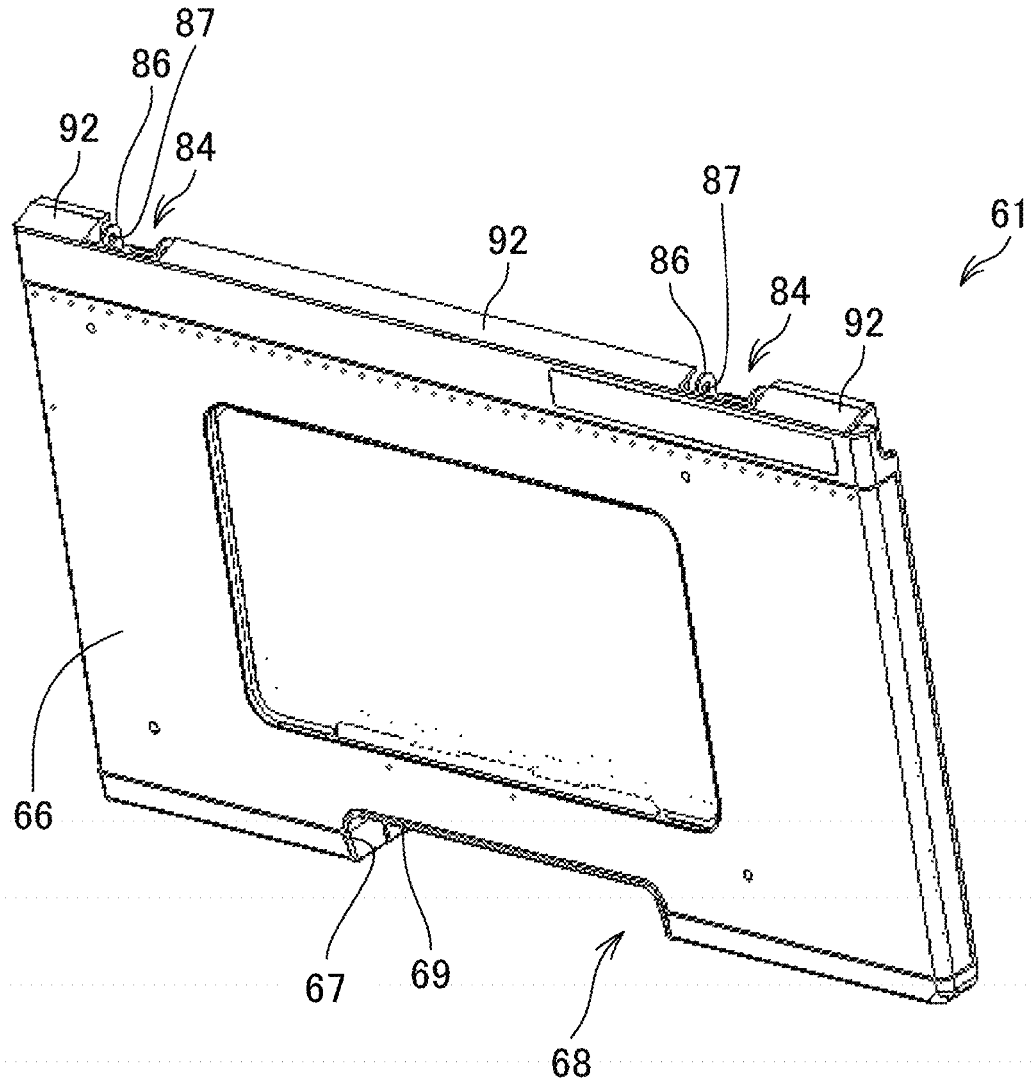
FIG. 6 is a perspective view of a lower section cover.

FIG. 6 is a perspective view of the lower cover section 61. As shown in FIG. 1, an upper end portion of the lower cover section 61 is connected to a lower end portion of the front surface panel section 65. When the sheet cover 16 is closed, the lower end portion of the lower cover section 61 is disposed at a position of the front surface 9 that is close to the bottom surface of the device case 10. The lower cover section 61 has a lower panel section 66. The lower panel section 66 is a flat plate-like member that forms the right and lower portion of the front surface 9.

A handhold section 68 is provided at the lower end portion of the lower cover section 61. The handhold section 68 has an opening section 67. The opening section 67 is provided by cutting out the lower end portion of the lower panel section 66 when the sheet cover 16 was closed, toward an upper portion of the lower panel section 66. The handhold section 68 has a recess section 69. In the lower cover section 61, the recess section 69 is provided on a surface that is located on an inside of the device case 10. The recess section 69 is a lid-shaped member that covers the entire opening section 67 in plan view. The recess section 69 is provided so as to form a curved surface that expands from the lower panel section 66 to the inside of the device case 10.

The user can easily grasp and pivot the sheet cover 16 by inserting fingers or the like into the handhold section 68. Further, by providing the recess section 69 in the printing device 1, dust and debris can be suppressed from entering to inside the device case 10 via the handhold section 68 while the sheet cover 16 is in the closed state. Note that the handhold section 68 may be integrally formed by injection molding, press working, or the like. In other words, the opening section 67 and the recess section 69 may be integrally provided.

The upper cover section 60 and the lower cover section 61 are coupled by a second coupling section 80. The second coupling section 80 has a third vane member 82, which is provided to the upper cover section 60, and a fourth vane member 84, which is provided to the lower cover section 61. As shown in FIG. 5, the third vane member 82 is attached to a flat surface of the front surface panel section 65 facing the inside of the device case 10. The third vane member 82 is a longitudinal member that extends in the up-down directions of the front surface panel section 65 in the closed state. One end section 83 of the third vane member 82 protrudes below a lower end portion of the front surface panel section 65, while the front surface panel section 65 is in the closed state. This end section 83 is provided with an insertion hole 85 that penetrates this end section 83 in the left-right directions. In the front surface panel section 65, two third vane members 82 are provided side by side along the left-right directions. The third vane member 82 corresponds to a “third vane section”.

As shown in FIGS. 5 and 6, the fourth vane member 84 is attached to a flat surface of the lower cover section 61 that faces the inside of the device case 10. The fourth vane member 84 is a longitudinal member that extends in the up-down directions of the lower cover section 61 in the closed state. One end section 86 of the fourth vane member 84 protrudes above an upper end portion of the lower cover section 61 while the front surface panel section 65 is in the closed state. This end section 86 is provided with an insertion hole 87 that penetrates this end section 86 in the left-right directions. Two fourth vane members 84 are provided in the front surface panel section 65 side by side along the left-right directions. The fourth vane member 84 corresponds to a "fourth vane section".

Figure 7:
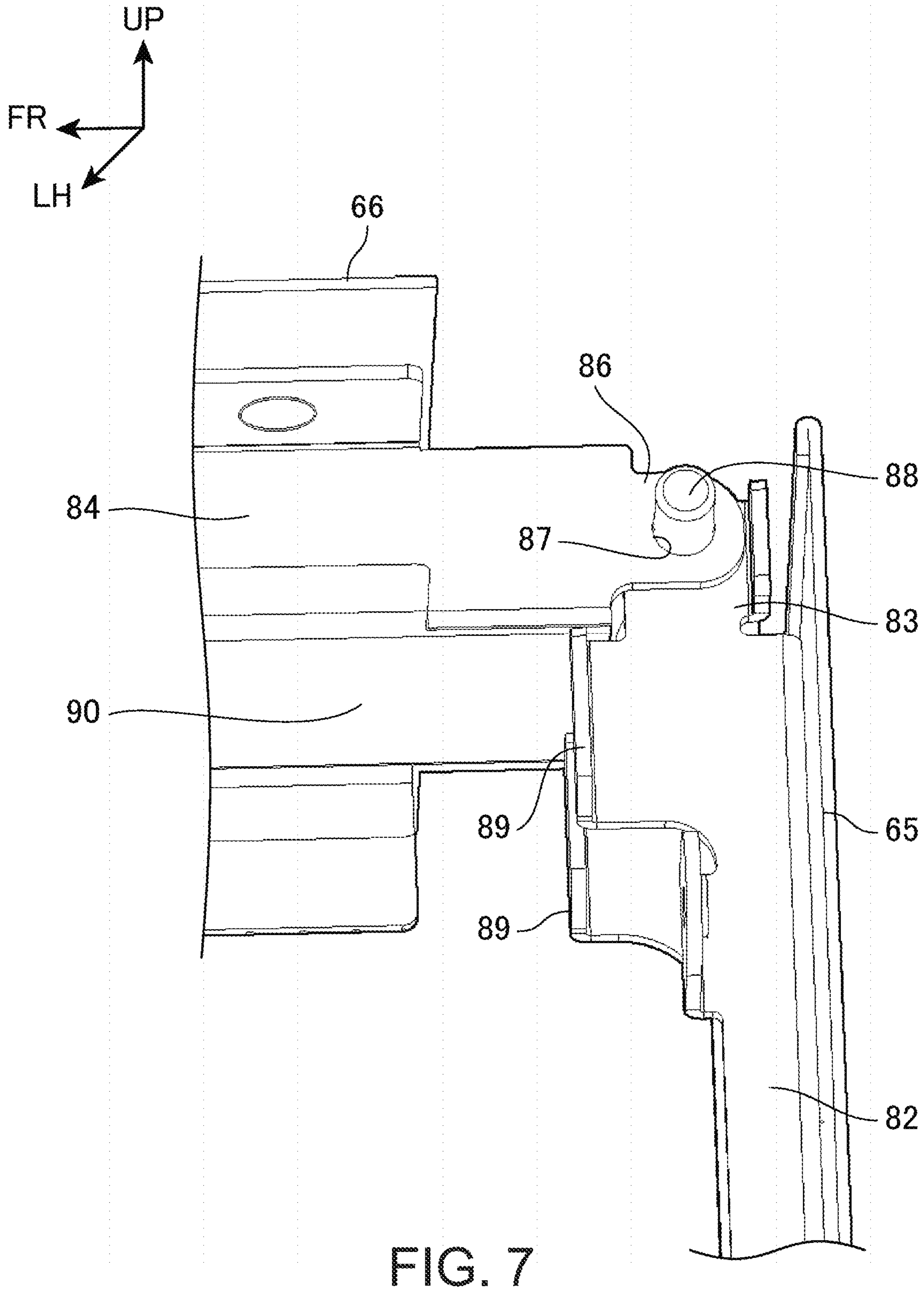
FIG. 7 is a perspective view of a second coupling section.

FIG. 7 is a perspective view showing the second coupling section 80 when the sheet cover 16 is in the closed state. FIG. 7 shows the second coupling section 80 of the sheet cover 16 cut along the virtual plane V shown in FIG. 2. In FIG. 7, a continuous surface section 92 is omitted for convenience of explanation. As shown in FIGS. 5 and 7, the third vane member 82 and the fourth vane member 84 are coupled by inserting a rod-shaped shaft body 88 into the insertion hole 85 and the insertion hole 87. By this, the lower cover section 61 becomes pivotable with respect to the upper cover section 60. In other words, the second coupling section 80 functions as a so-called hinge member. The second coupling section 80 functions as a first surface pivot shaft.

As shown in FIG. 7, the fourth vane member 84 has a flat surface 90. The flat surface 90 is a plane surface parallel to a flat surface of the lower cover section 61. The flat surface 90 faces the inside of the device case 10 when the sheet cover 16 is in the closed state.

As shown in FIG. 7, protruding sections 89 are provided on the third vane members 82. The protruding sections 89 have a projecting shape that protrudes in a predetermined dimension from a region adjacent to the end section 83 of the third vane member 82 toward an opposite side of the front surface panel section 65. In other words, the protruding sections 89 protrude with respect to the third vane member 82 from a portion that is adjacent to the end section 83 and a portion that is positioned at the other end portion side than the end section 83, toward the opposite side of the front surface panel section 65. The protruding sections 89 protrude toward the inside of the device case 10 when the sheet cover 16 is in the closed state.

As described above, the lower cover section 61 is pivotable toward a surface of the front surface panel section 65 that is located inside of the device case 10 with the shaft body 88 as a pivot shaft. When the lower cover section 61 pivots up to a position where an inner angle formed by the lower cover section 61 and the front surface panel section 65 is substantially a right angle, the protruding sections 89 are in contact with the flat surface 90.

In this way, by contacting the protruding section 89 with the flat surface 90 of the fourth vane member 84, the edge section of the third vane member 82 is suppressed from contacting the edge section of the fourth vane member 84. As a result, in the printing device 1, wear of the third vane member 82 and the fourth vane member 84 is suppressed. In other words, the protruding section 89 and the flat surface 90 form a so-called contact and stop structure.

As shown in FIGS. 5 and 6, the continuous surface section 92 is provided at the upper end portion of the lower cover section 61. The continuous surface section 92 is attached to a flat surface of the lower cover section 61 that faces the inside of the device case 10. The continuous surface section 92 forms an inclined surface that inclines towards the inside of the housing as it extends upwards from the upper end portion of the lower cover section 61. The continuous surface section 92 is provided at a position at the upper end portion of the lower cover section 61 where it avoids the end sections 86. The continuous surface section 92 is covered by the lower end portion of the front surface panel section 65 when the sheet cover 16 is in the closed state. In other words, the continuous surface section 92 is located at the inside of the device case 10 when the sheet cover 16 is in the closed state.

Figure 8:
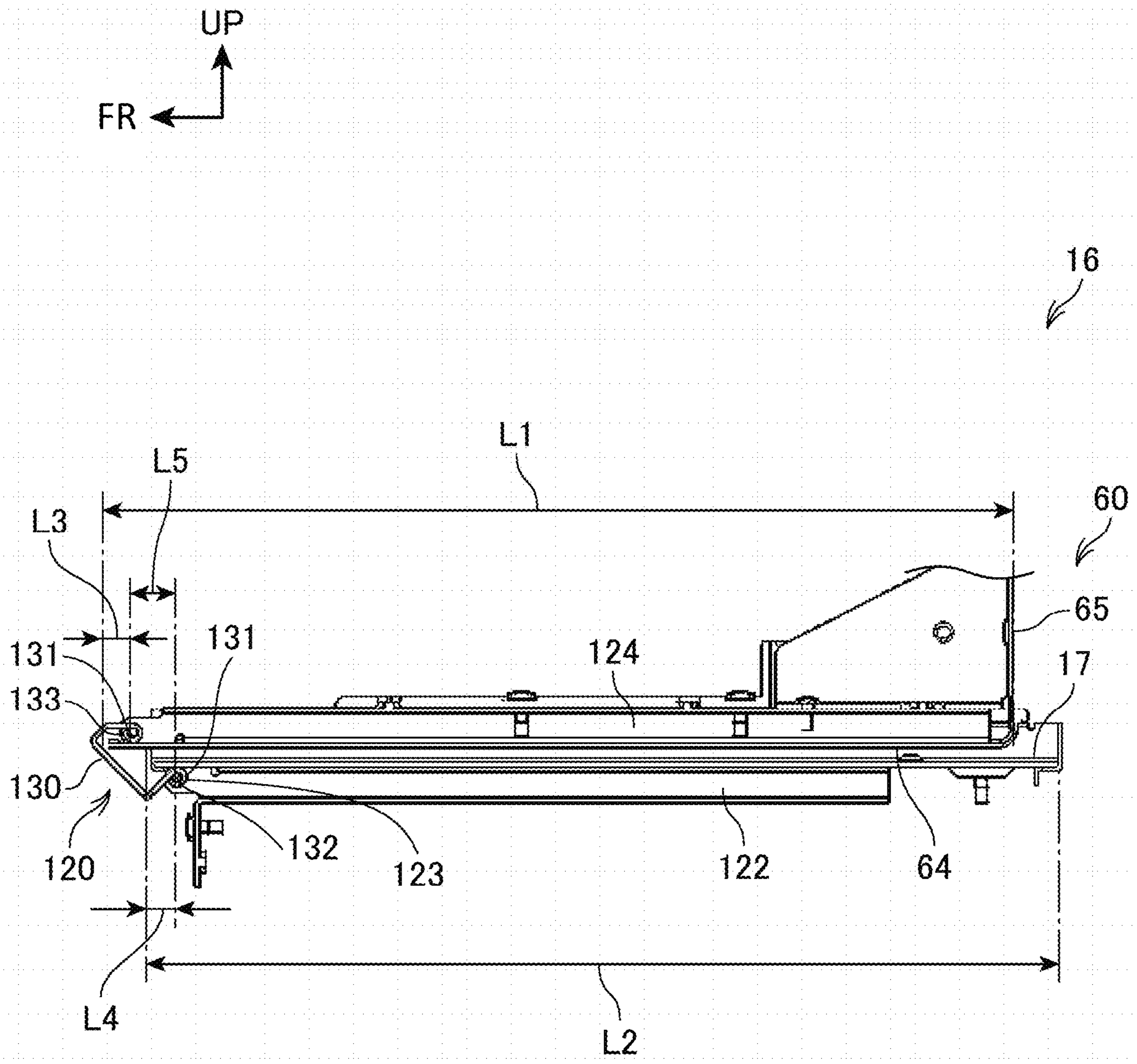
FIG. 8 is a sectional view of the sheet cover.

FIG. 8 is a sectional view of the sheet cover 16. FIG. 8 is a cross sectional view of the sheet cover 16 that is cut in the virtual plane V of FIG. 2 as viewed from the right direction. As shown in FIGS. 5 and 8, the upper cover section 60 is coupled to the top surface panel 17 via the first coupling section 120. The first coupling section 120 has a first vane member 122 provided on the top surface panel 17 and a second vane member 124 provided on the upper cover section 60. As shown in FIG. 5, the first vane member 122 is attached to a flat surface of the top surface panel 17 that faces the inside of the device case 10. The first vane member 122 is entirely covered by the top surface panel 17. The first vane member 122 is an elongated member extending in the front-rear directions. As shown in FIG. 8, the first vane member 122 has an insertion hole 123 that penetrates in the left-right directions, at one end section of the first vane member 122 where it is located at the top surface panel section 64 side. In the top surface panel 17, two first vane members 122 are provided side by side along the left-right directions. The first vane member 122 corresponds to a "first vane section."

As shown in FIGS. 5 and 8, the second vane member 124 is attached to a flat surface of the top surface panel section 64 that faces the inside of the device case 10. The second vane member 124 is an elongated member extending in the front-rear directions when the top surface panel section 64 is in the closed state. The second vane member 124 is entirely covered by the top surface panel section 64. As shown in FIG. 5, the second vane member 124 has an insertion hole 125 that penetrates in the left-right directions, at one end section 86 of the second vane member 124 where it is located at the top surface panel 17 side. In the front surface panel section 65, two second vane members 124 are provided side by side along the left-right directions. The second vane member 124 corresponds to a "fourth vane section."

As shown in FIGS. 5 and 8, the first coupling section 120 has a core rod coupling member 130. The core rod coupling member 130 is an elongated plate-like member extending along the left-right directions. The core rod coupling member 130 has a length dimension in the longitudinal direction that is substantially the same as a length dimension of the top surface panel 17 in the left-right directions and a length dimension of the top surface panel section 64 in the left-right directions. Both end portions of the core rod coupling member 130 at positions in a direction perpendicular to the longitudinal direction are upright. Both end portions have a cylindrical insertion section 131 that extends along the longitudinal direction of the core rod coupling member 130.

The first vane member 122 is coupled to the core rod coupling member 130 by inserting a first core rod 132 into the insertion hole 123 and one of the insertion sections 131. The second vane member 124 is coupled to the core rod coupling member 130 by inserting a second core rod 133 into the insertion hole 125 and the other insertion section 131. As a result, the first vane member 122 and the second vane member 124 are coupled to each other via the core rod coupling member 130. By this, the upper cover section 60 is pivotable with respect to the top surface panel 17. In other words, the first coupling section 120 functions as a so-called two-axis hinge member. The first coupling section 120 functions as a top surface pivot shaft.

Here, dimensions relating to the first coupling section 120 will be described. As shown in FIG. 8, it is assumed that a length dimension of the top surface panel section 64 in the front-rear directions is dimension L1. A length dimension of the top surface panel 17 in the front-rear directions is assumed to be dimension L2. A distance, in the front-rear directions, between an end portion of the top surface panel 17 side of the top surface panel section 64 and the second core rod 133 is assumed to be dimension L3. A distance, in the front-rear directions, between an end portion of the top surface panel section 64 side of the top surface panel 17 and the first core rod 132 is assumed to be dimension L4. A length between the first core rod 132 and the second core rod 133 in the front-rear directions is assumed to be dimension L5. In the printing device 1, the top surface panel 17, the upper cover section 60, and the first coupling section 120 are formed so as to satisfy the following formula (1).

$$L1-L3-L5 \leq L2-L4 \quad (1)$$

In this embodiment, by being formed to satisfy the formula (1), the sheet cover 16 is arranged at a position where a rear end of the sheet cover 16 does not protrude outward from the rear surface 7 in plan view.

Next, operation of the embodiment will be described. In the printing device 1, the label paper 100 stored in the accommodation section 20 is transported to the print section 22 by the transport section 24, and printing is performed on each of the print surfaces of the labels on the label paper 100.

In the printing device 1, by opening and closing the sheet cover 16, it is possible to access the inside of the device case 10 and to perform various operations, such as setting in or taking out the label paper 100 to and from the accommodation section 20 and operating the paper guide unit 30.

Figure 9:
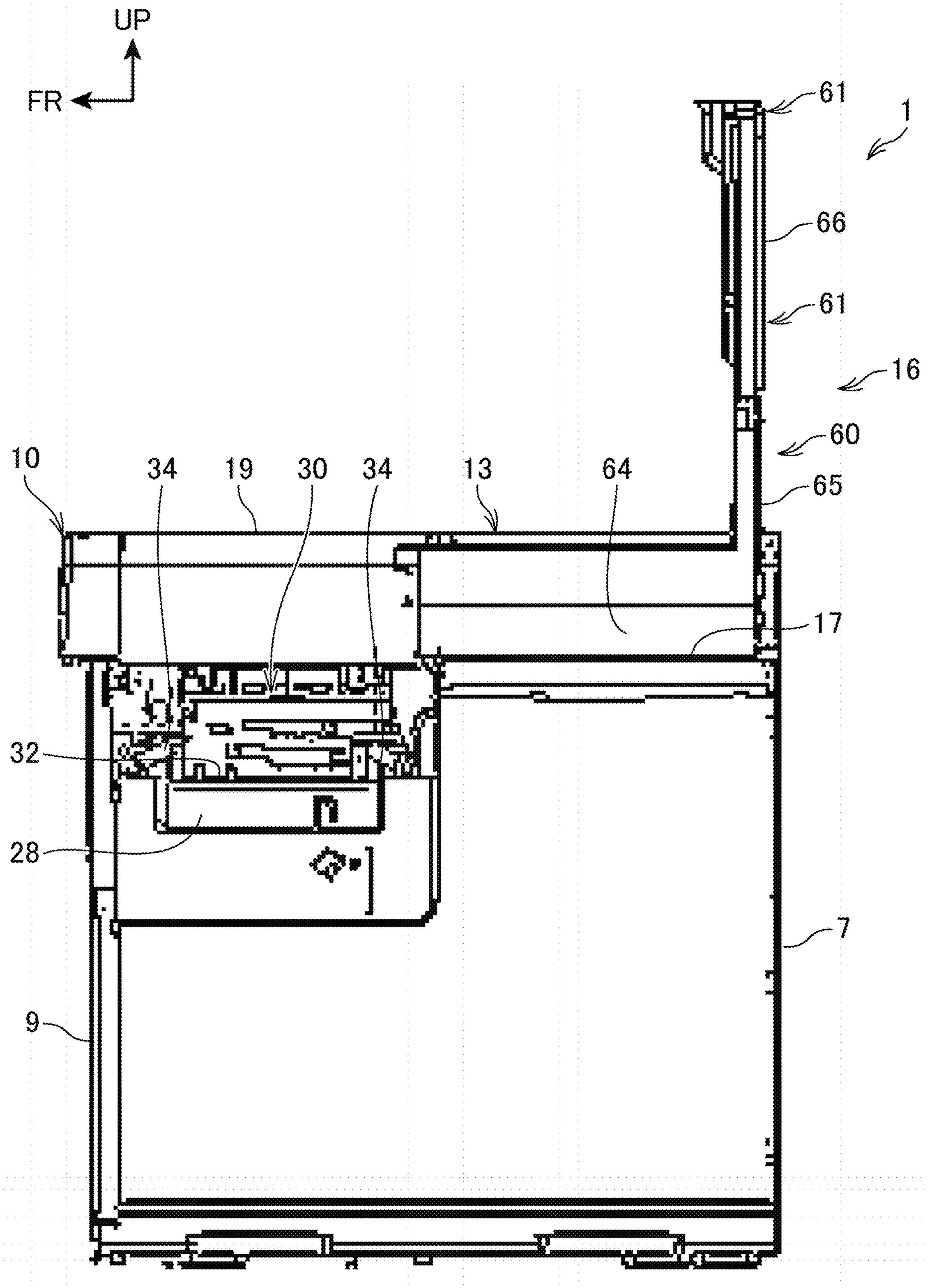
FIG. 9 is a side view of the printing device as viewed from the right direction.

FIG. 9 is a side view of the printing device 1 as viewed from the right direction. FIG. 9 shows a state in which the sheet cover 16 is most opened within its pivotable range. When opening the sheet cover 16, the user inserts fingers or the like into the handhold section 68 to grasp and pivot the sheet cover 16. As shown in FIG. 9, the upper cover section 60 is placed on the top surface panel 17 in a state in which the sheet cover 16 is most opened within its pivotable range. In this case, the top surface panel section 64 is located facing the top surface panel 17 and the bottom surface of the device case 10, and is in surface contact with an upper surface of the top surface panel 17.

The sheet cover 16 arranged in this way is, in plan view, entirely disposed on the upper surface of the top surface panel 17. In other words, the sheet cover 16 is placed at a position where, in plan view, the rear end of the sheet cover 16 does not protrude outward from the rear surface 7. By this, printing device 1 can suppress an increase in the foot print of the printing device.

In a state in which the sheet cover 16 is most opened within its pivotable range, the front surface panel section 65 is disposed facing the rear surface 7 and the front surface 9.

Figure 10:
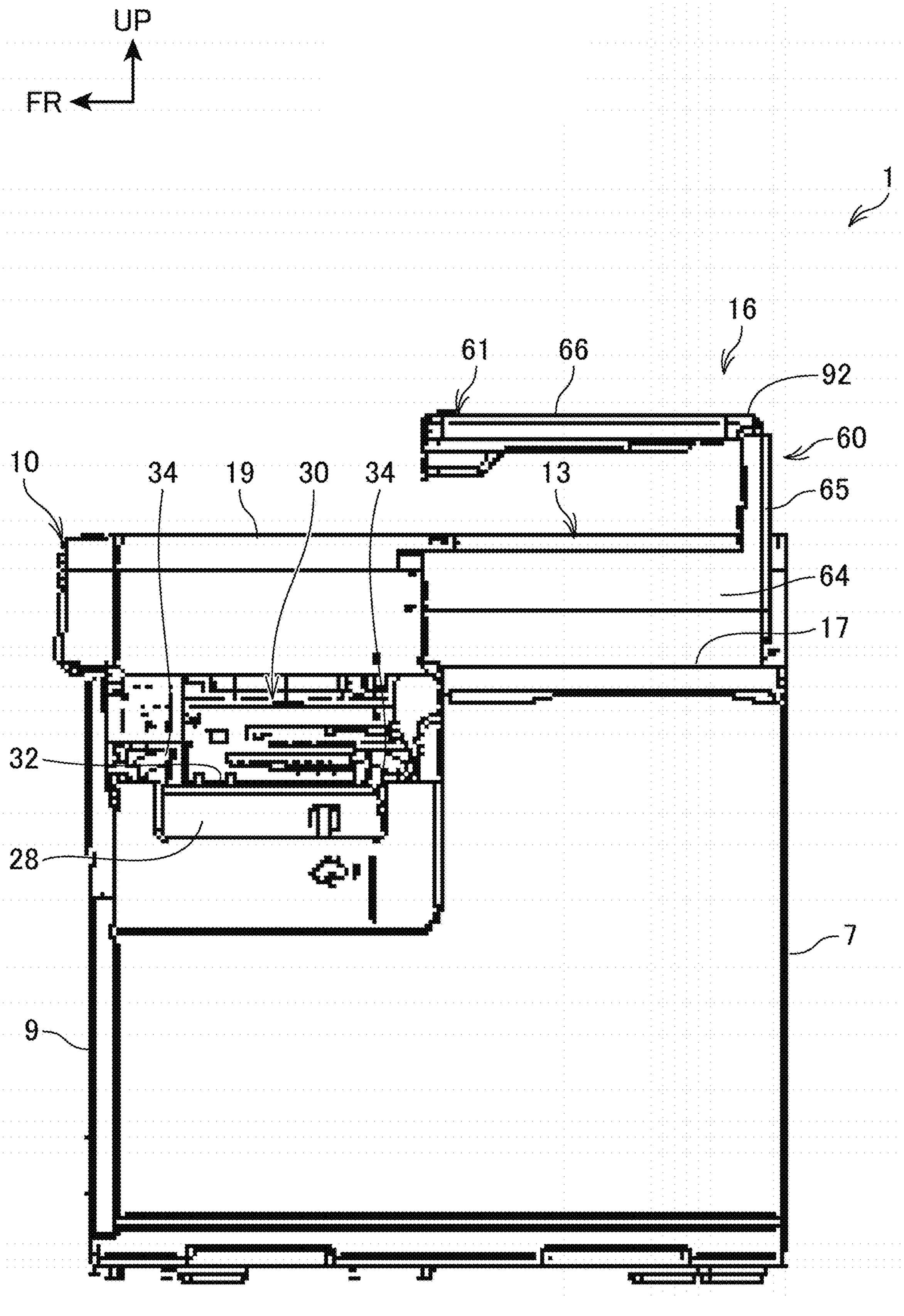
FIG. 10 is another side view of the printing device as viewed from the right direction.

FIG. 10 is a side view of the printing device 1 as viewed from the right direction. FIG. 10 shows a state in which the lower cover section 61 is pivoted while the sheet cover 16 is in a state most opened within its pivotable range. As shown in FIG. 10, in the printing device 1, the lower cover section 61 can pivot during a state in which the sheet cover 16 is most opened within its pivotable range. In this state, when the lower cover section 61 pivots, the lower panel section 66 is arranged that its flat surface faces the top surface section 15 of the device case 10 and the top surface panel section 64. By this, in a state where the sheet cover 16 is most opened within its pivotable range, the printing device 1 can suppress the lower cover section 61 from protruding significantly upward from the device case 10. Therefore, the printing device 1 can suppress an increase in space required for installation.

In case the lower panel section 66 is arranged facing the top surface section 15 of the device case 10 and the top surface panel section 64, the lower cover section 61 is arranged at a position where none of the lower cover section 61 overlaps the paper guide unit 30 in plan view. By this, the printing device 1 can suppress the user from being prevented from operating the paper guide unit 30 in a state where the sheet cover 16 is the most opened within its pivotable range.

The printing device 1 can arrange the lower panel section 66 so that it faces the top surface section 15 and the top surface panel section 64 in a state where the sheet cover 16 is most opened within its pivotable range. In the case where the lower panel section 66 is arranged in this way, the gap between the lower panel section 66 and the front surface panel section 65 is at least partially closed by the continuous surface section 92. By this, even when the sheet cover 16 is opened, the printing device 1 can suppress a mechanism relating to pivoting of the sheet cover 16, such as the second coupling section 80, from being exposed outside the device case 10. Therefore, design of the printing device 1 can be improved.

As described above, the first vane member 122, the second vane member 124, and the first coupling section 120 are disposed inside the device case 10. Similarly, the third vane member 82, the fourth vane member 84, and the second coupling section 80 are disposed inside the device case 10. By these, the printing device 1 can suppress a mechanism relating to pivoting of the sheet cover 16 from being exposed outside the device case 10. Therefore, in the printing device 1, design of the device can be improved, and an installation space of the printing device 1 can be kept compact. Further, the printing device 1 can suppress the possibility of the user touching a mechanism relating to the pivot of the sheet cover 16.

As described above, the handhold section 68 and the display/operation panel 12 are both disposed on the front surface 9. By this, the user can open and close the sheet cover 16 and can operate the display/operation panel 12 while facing the front surface 9. By this, the printing device 1 can suppress the need for the user to change position with respect to the printing device 1. Therefore, the printing device 1 can reduce an amount of user movement when the printing device 1 is operated.

The above described embodiment exemplifies one aspect of the present disclosure, and can be arbitrarily modified and applied without departing from the gist of the present disclosure.

Figure 11:
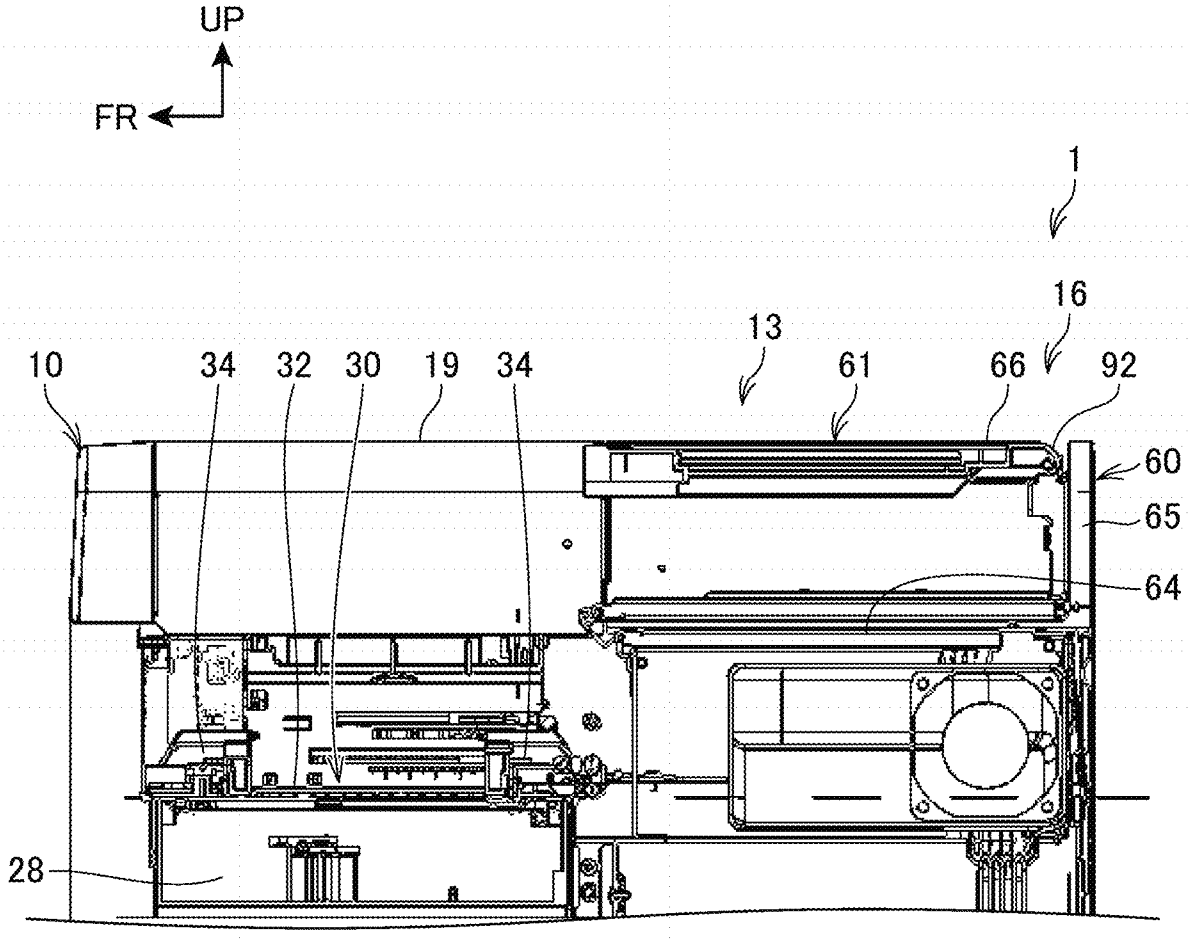
FIG. 11 is a side view of a printing device regarding to a modified example, viewed from the right direction.

FIG. 11 is a side view of the printing device 1 according to the modification as viewed from the right direction. As shown in FIG. 11, in the printing device 1, in a case where the lower panel section 66 is located facing the top surface panel section 64 in a state where the sheet cover 16 is most opened within its pivotable range, the upper surface of the lower panel section 66 may be arranged at substantially the same height as a top surface section 13. In other words, the lower panel section 66 may be arranged at a position where it is flush with the top surface section 13. By this, the printing device 1 can use the lower panel section 66 and the top surface section 13 as a placement surface on which the label paper 100 or the like can be placed. In other words, in the printing device 1, the upper surface composed of the lower panel section 66 and the top surface section 13 can be utilized as a work table or the like.

Figure 12:
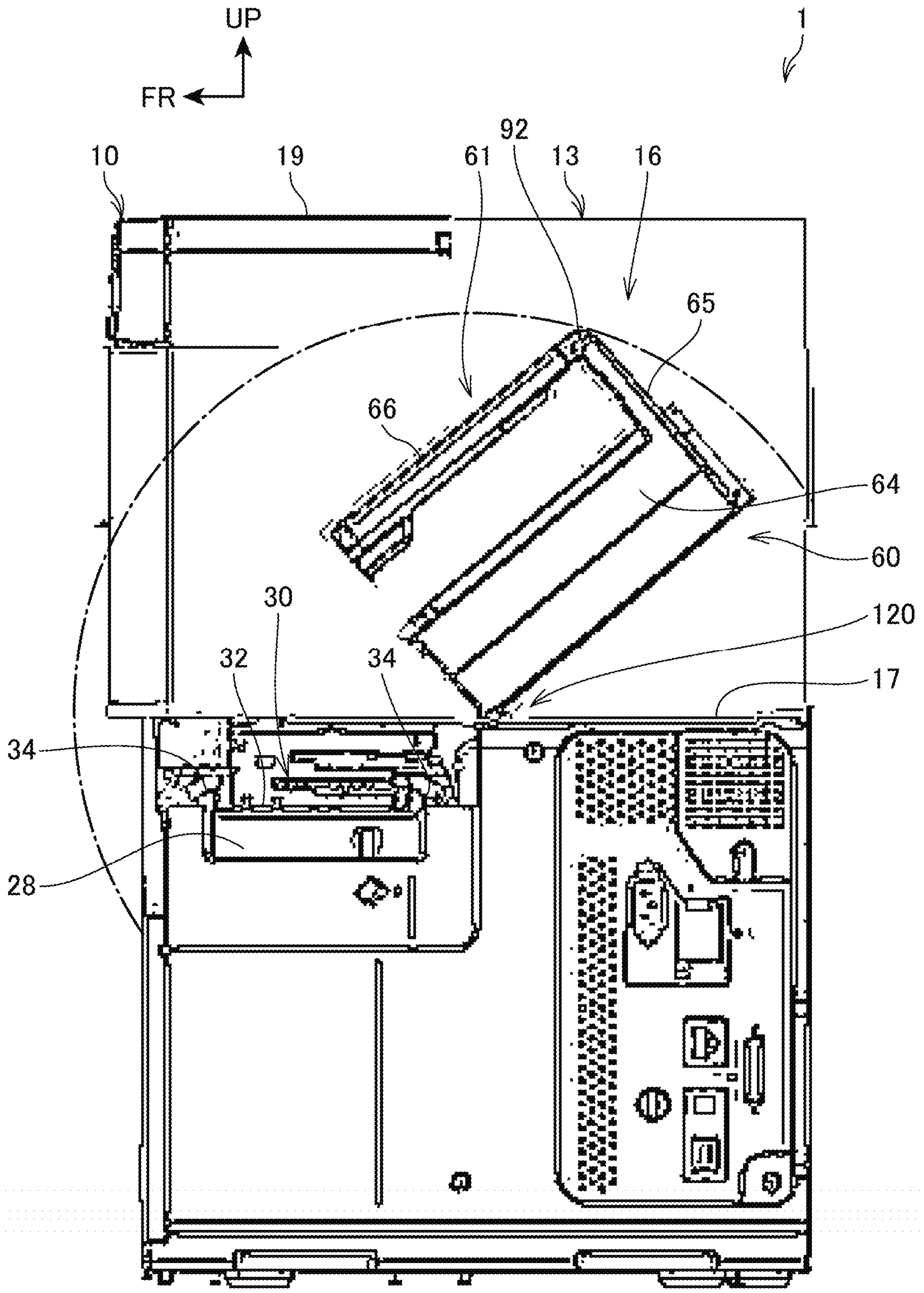
FIG. 12 is a side view of a printing device regarding to another modified example, viewed from the right direction.

FIG. 12 is a side view of the printing device 1 according to another modification as viewed from the right direction. In FIG. 12, for convenience of description, a trajectory of an edge section of the continuous surface section 92 that passes farthest outward when the sheet cover 16 pivots, is shown as a single dotted chain line. As shown in FIG. 12, the printing device 1 may be formed such that the entire sheet cover 16 passes below the top surface section 13 in the up-down directions when the sheet cover 16 pivots within its pivotable range. By this, the printing device 1 can suppress an increase in space required for installation of the printing device 1 in the up-down directions in conjunction with the opening and closing of the sheet cover 16.

In the above embodiments, a label printer is exemplified as the printing device 1. However, the printing device 1 is not limited to a label printer. The printing device 1 may be a device having a transport device that transports the print medium and a print section 22 that performs printing on the print medium. For example, the printing device 1 may be a large format printer, a textile printing machine that performs textile printing, or the like.

For example, another device such as a peeler that performs a process of peeling the label from the base paper may be provided on the left side surface of the printing device 1.

In the embodiments described above, a line head type of print head is shown as an example of the print head 42, but it is not limited to this and may be a serial head type of print head. The printing method of the print head 42 is not limited to an inkjet type.

The directions such as horizontal and vertical directions, various numerical values, and shapes in the above-mentioned embodiments include the so-called equality range of directions, numerical values and shapes that have the same effect as those directions, numerical values and shapes, unless otherwise stated.

Summary of Present Disclosure

Hereinafter, a summary of the present disclosure is noted.

Note 1. The printing device includes a medium accommodation section in which a print medium is stored; a print section that has an image forming section that forms an image on the print medium; a medium transport section that transports the print medium stored in the medium accommodation section toward the image forming section; and a housing that accommodates the medium accommodation section, the print section, and the medium transport section, wherein the housing has a first surface that is one side surface of the housing, a second surface that faces the first surface, and an opening and closing section that is opened and closed when the print medium is stored in the medium accommodation section, the opening and closing section is opened and closed by pivoting around a top surface pivoting shaft, which is along a top surface of the housing and has an upper section cover that forms at least a portion of the first surface and at least a portion of a top surface of the housing, and that moves above the housing when the opening and closing section is opened, and the upper section cover is arranged at a position where it faces a bottom surface of the housing when the opening and closing section is at its most opened state within its pivotable range, and at a position where, in a plan view, the upper section cover does not protrude outward from the second surface when the opening and closing section is at its most opened state within its pivotable range. By this, the printing device can keep the foot print of the printing device compact.

Note 2. The printing device according to note 1, further including a guide section that, inside the housing, guides the print medium from the medium accommodation section to the medium transport section, wherein the opening and closing section is disposed at a position where the opening and closing section does not overlap with the guide section in a plan view when the opening and closing section is at its most opened state within its pivotable range. By this, the printing device can provide a configuration that does not interfere with the operation of the guide section, while keeping the foot print of the printing device compact.

Note 3. The printing device according to note 1 or note 2, further including a first coupling section that configures the top surface pivot shaft, wherein the first coupling section has a first vane section that is disposed in an area of the top surface other than the upper section cover, and a second vane section that is provided on the upper section cover, and the first vane section and the second vane section are disposed inside the housing. By this, the printing device can fit into a compact installation space for the printing device.

Note 4. In the printing device according to note 3, wherein the first coupling section has a first core rod that is attached to the first vane section, a second core rod that is attached to the second vane section, and a core rod coupling member that couples the first core rod and the second core rod. By this, the printing device can be compactly fitted into the installation space of the printing device with a relatively simple configuration.

Note 5. In the printing device according to any one of notes 1 to 3, wherein the opening and closing section has a lower section cover that is disposed below the upper section cover, in a state where the opening and closing section is closed, the lower section cover is pivotable with respect to the upper section cover around a first surface pivot shaft, which is along the first surface of the housing, and a flat surface of the lower section cover is disposed facing upward, in a state where the opening and closing section is at its most opened state within its pivotable range. By this, the printing device can fit into a compact installation space for the printing device.

Note 6. The printing device according to note 5, further including a second coupling section that configures the first surface pivot shaft, wherein the second coupling section has a third vane section that is attached to the upper section cover and a fourth vane section that is attached to the lower section cover and the third vane section and the fourth vane section are disposed inside the housing. By this, the printing device can fit into a compact installation space for the printing device.

Note 7. In the printing device according to note 6, wherein when a flat surface of the lower section cover is disposed facing upward in a state where the opening and closing section is at its most opened state within its pivotable range, an end portion of the third vane section that is closest to the second coupling section contacts a flat surface of the fourth vane section. By this, the printing device can suppress wear of the members that configure the second coupling section.

Note 8. In the printing device according to any one of notes 5 to 7, wherein the lower section cover has a handhold section on which the user hangs user's hand when opening or closing the opening and closing section and the handhold section has an opening section through which a user can insert the user's hand and a recess section that closes the opening section while forming a depression continuous from the opening section. By this, in the printing device, opening and closing of the opening and closing section can be facilitated, and dust and other foreign matter can be suppressed from entering the inside of the printing device.

Note 9. In the printing device according to any one of notes 5 to 8, wherein the housing has a print section cover that covers the print section and in a case where a flat surface of the lower section cover is facing upward in a state where the opening and closing section is at its most opened position within its pivotable range, an upper surface of the print section cover and the flat surface of the lower section cover are substantially the same position in the up-down direction of the housing. By this, when the opening and closing section is opened, the printing device can effectively utilize the upper surface of the printing device as a worktable, or the like.

Note 10. In the printing device according to any one of notes 1 to 8, wherein the housing has a print section cover that covers the print section and when the opening and closing section is opened or closed, the opening and closing section moves below an upper surface of the print section cover in the up-down direction of the housing. By this, the printing device can fit into compact installation space for the printing device.

Note 11. The printing device according to any one of notes 1 to 10, further including an operation section that is disposed on the first surface. By this, the printing device can reduce the user's movement when operating the printing device.

What is claimed is:

1. A printing device comprising:

a medium accommodation section in which a print medium is stored;

a print section that has an image forming section that forms an image on the print medium;

a medium transport section that transports the print medium stored in the medium accommodation section toward the image forming section; and a housing that accommodates the medium accommodation section, the print section, and the medium transport section, wherein the housing has a first surface that is one side surface of the housing, a second surface that faces the first surface, and an opening and closing section that is opened and closed when the print medium is stored in the medium accommodation section, the opening and closing section is opened and closed by pivoting around a top surface pivot shaft, which is along a top surface of the housing and has an upper section cover that forms at least a portion of the first surface and at least a portion of a top surface of the housing, and that moves above the housing when the opening and closing section is opened, and the upper section cover is arranged at a position where it faces a bottom surface of the housing when the opening and closing section is at its most opened state within its pivotable range, and at a position where, in a plan view, the upper section cover does not protrude outward from the second surface when the opening and closing section is at its most opened state within its pivotable range.

2. The printing device according to claim 1, further comprising:

a guide section that, inside the housing, guides the print medium from the medium accommodation section to the medium transport section, wherein the opening and closing section is disposed at a position where the opening and closing section does not overlap with the guide section in a plan view when the opening and closing section is at its most opened state within its pivotable range.

3. The printing device according to claim 1, further comprising:

a first coupling section that configures the top surface pivot shaft, wherein the first coupling section has a first vane section that is disposed in an area of the top surface other than the upper section cover, and a second vane section that is provided on the upper section cover, and the first vane section and the second vane section are disposed inside the housing.

4. The printing device according to claim 3, wherein the first coupling section has a first core rod that is attached to the first vane section, a second core rod that is attached to the second vane section, and a core rod coupling member that couples the first core rod and the second core rod.

5. The printing device according to claim 1, wherein the opening and closing section has a lower section cover that is disposed below the upper section cover, in a state where the opening and closing section is closed, the lower section cover is pivotable with respect to the upper section cover around a first surface pivot shaft, which is along the first surface of the housing, and a flat surface of the lower section cover is disposed facing upward, in a state where the opening and closing section is at its most opened state within its pivotable range.

6. The printing device according to claim 5, further comprising:

a second coupling section that configures the first surface pivot shaft, wherein the second coupling section has a third vane section that is attached to the upper section cover and a fourth vane section that is attached to the lower section cover and the third vane section and the fourth vane section are disposed inside the housing.

7. The printing device according to claim 6, wherein when the flat surface of the lower section cover is disposed facing upward in a state where the opening and closing section is at its most opened state within its pivotable range, an end portion of the third vane section that is closest to the second coupling section contacts a flat surface of the fourth vane section.

8. The printing device according to claim 5, wherein the lower section cover has a handhold section on which the user hangs user's hand when opening or closing the opening and closing section and the handhold section has an opening section through which a user can insert the user's hand and a recess section that closes the opening section while forming a depression continuous from the opening section.

9. The printing device according to claim 5, wherein the housing has a print section cover that covers the print section and in a case where a flat surface of the lower section cover is facing upward in a state where the opening and closing section is at its most opened position within its pivotable range, an upper surface of the print section cover and the flat surface of the lower section cover are substantially the same position in the up-down direction of the housing.

10. The printing device according to claim 1, wherein the housing has a print section cover that covers the print section and when the opening and closing section is opened or closed, the opening and closing section moves below an upper surface of the print section cover in the up-down direction of the housing.

11. The printing device according to claim 1, further comprising:

an operation section that is disposed on the first surface.

* * * * *